March 14, 1933.  S. K. RAMOS  1,901,261
AUTOMOBILE EXTRACTOR
Filed Jan. 29, 1930
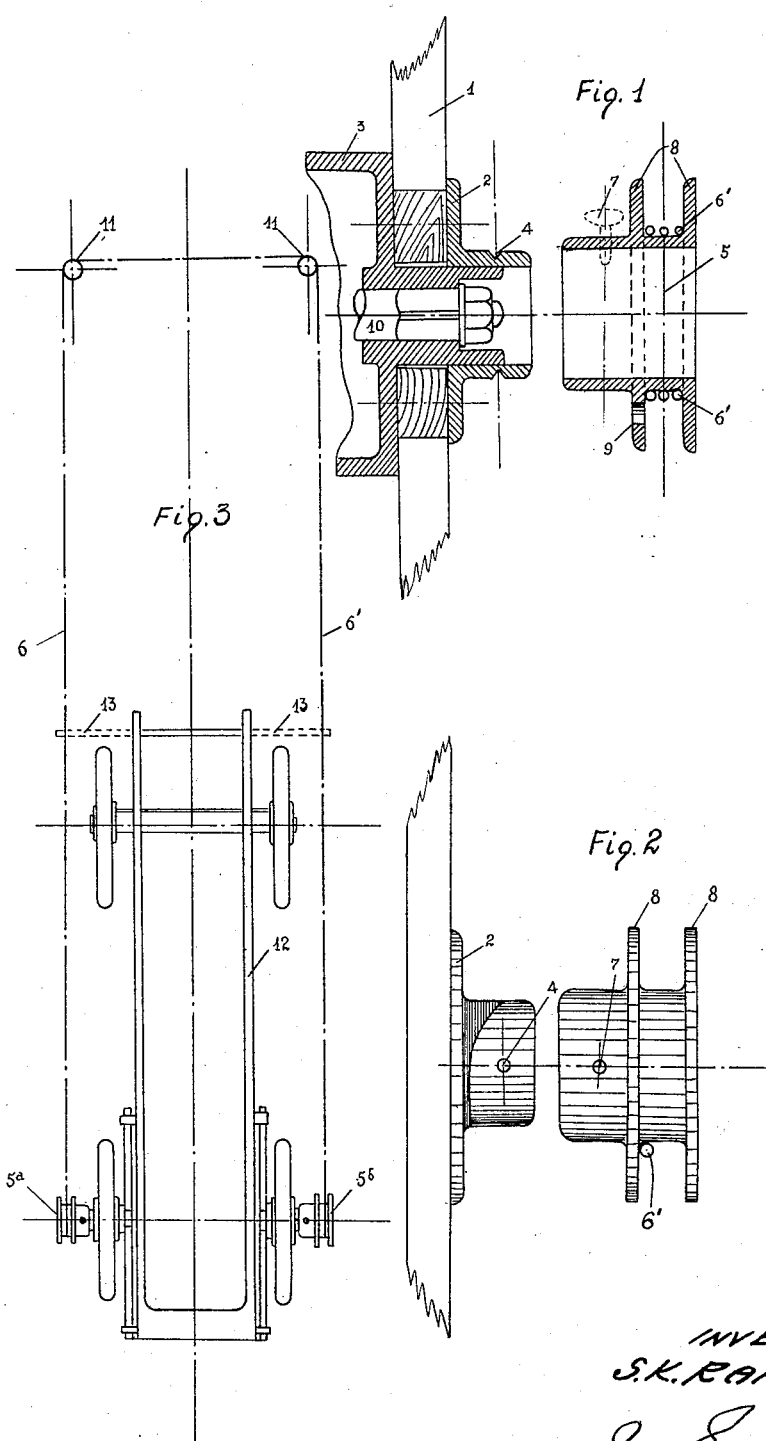

Patented Mar. 14, 1933

1,901,261

UNITED STATES PATENT OFFICE

SEBASTIÃO KNEIPP RAMOS, OF LAGOA VERMELHA, BRAZIL

AUTOMOBILE EXTRACTOR

Application filed January 29, 1930, Serial No. 424,348, and in Brazil February 24, 1929.

The present invention relates to a device for using the power of the motor-wheels to remove automotive vehicles from holes, ditches, muddy and unstable places, intended for the purpose of withdrawing automotive vehicles stuck in such places, when the motor wheels, instead of propelling the vehicle, skid or turn loosely without securing the necessary adherence on the ground to produce sufficient traction power to move the vehicle. It often happens that the roadways present muddy or unstable stretches, which yield under the weight of the vehicle, and cause the vehicle to sink so that the more its motor-wheels turn, the more they get stuck in the ground. Under ordinary conditions the only resource is to use animal traction to disengage or pull out the vehicle; however it is not always possible to use animal traction for this purpose, specially in distant localities and unpeopled places in the interior, where this kind of assistance is not always available, or where it is difficult and expensive to procure horses, mules or oxen, besides the considerable space of time lost in finding same, in such remote places.

The present invention furnishes a device which enables the driver of a motor vehicle to pull out or remove his vehicle from any place which is rendered improper for locomotion through lack of wheel-traction and adherence, by using the power of the engine as a means of traction. For this purpose, according to the present invention, a pair of detachable sleeve-reels is temporarily attached to the end of the propelling shaft or to the hub of the motor-wheels of the vehicle, one reel on each side, said reels being designed to roll a cable or rope made of any suitabl material, and are preferably inserted on or coupled to the hub or end of the motor shaft. The rope or cable is tied or otherwise attached on each end to one of the reels, so that its length is passed in an horizontal plane around one or more stumps, props or stakes—preferably two such propping means—which are fixed on the ground outside in front or back of the vehicle, more or less in a normal position to the pulling movement of the reels, so that when the motor-wheels are made to turn, while the wheels skid the rope or cable is rolled around said reels and push the vehicle towards the stakes or props, thereby removing same from the hole or muddy place in which it was stuck. The cable or rope is one only continuous length, which allows a compensation or distribution of the traction effort exerted by the two reels attached to the hubs of the motor-wheels. For use in connection with this device, I prefer to provide for two guides for the cable or rope, in the front of the frame or chassis, said guides being intended to avoid the contact between the cable or rope and the vehicle, and the scratching of the body thereof. One of the simplest modes of realization of the present invention consists in making sleeve-shaped-reels, which are attached to the hubs of the motor-wheels and are fixed thereto in any suitable manner. The accessory equipment of automotive vehicle thus fitted to remove itself by its own power from holes, ditches, muddy and unstable places consists of two sleeve-reels, one steel cable or Manilla or Cairo rope, and two wooden stakes or pointed steel tubes. Any stumps or sufficiently strong sticks of wood, attachable to the ground, as well as the trunks of trees, can be used instead of stakes, provided they are located in an appropriate position.

The attached drawing shows one of the forms of the execution of the present invention.

On the subjoined drawing:

Fig. 1 is a cross-section denoting a motor-wheel, the hub of which is sectioned, showing a sleeve, also sectioned, and the reel before it is attached to the hub of the wheel. The wheel represented is a common automobile wheel with wooden spokes.

Fig. 2 is a plane view of Fig. 1 in the same position; and

Fig. 3 is a diagram of an automobile, showing the mode of attachment of the sleeve reels or device according to the present invention.

Figure 1 on the left side shows the hub of a wheel with wooden spokes 1, the central part of which is an extension with a circularly angle-shaped piece 2, which is fixed with the spokes of the internal supporting drum 3 of the hub. The extension 2 is preferably provided with holes or a groove 4.

The sleeve 5, which has an in-built reel 6, has an internal diameter slightly greater than the external diameter of the cylindrical extension 2 on the hub, so that it can be easily attached to said extension. A screw 7 fixes the sleeve on the extension of the hub; however, instead of said screw, can be used a pin or any other known attaching means, which will produce the same result. Likewise, the hub extension can be shaped in an hexagonal or octagonal section, but it can be so shaped that a means of attachment can be provided without screws.

The reel consists preferably of 2 normal walls 8, between which the cable or rope 6' is rolled. Said cable or rope can be tied to the reel in any suitable manner, provided that it is strongly and easily tied or connected thereto. In the execution of the invention herein shown, said cable or rope is passed through a hole 9, made on one of the walls of the reel 8. Said rope or cable can be easily attached in this or in any other manner, i. e., through a gap or hole made in the cylindrical section of the sleeve, by fixing the rope or cable to the reel with a pin or similar fixture tied to its end.

The sleeve-reels are inserted on the hubs as shown on Figure 3. The mode of making this attachment can be easily realized by imagining the axial displacement of the two pieces shown on Figures 1 and 2, in a leftwise direction. In this manner the sleeve-reels are coupled to the end of the propelling shaft 10 of the automotive vehicle. The rope or cable—preferably a steel cable 6' is extended from one of the reels 5—a, for instance, around the stakes 11, which are fixed on the ground in a suitable place and direction, the other end of the cable being attached to the other sleeve reel 5—b. In order to avoid the contact of the cable and the scratching of the chassis or body of the vehicle 12, in case the traction movement is exerted in a forward instead of a rearward direction, I prefer to use two guides 13 for the rope or cable, which guides are attached to the front part of the chassis. When the vehicle is pulled out in the rearward direction, it is not necessary to use said guides, because the cable or rope in such case does not come in contact with any part of the chassis or body of the car, as can be readily understood by examining the position and separation existing between the sleeve reels 5—a and 5—b.

From the foregoing any person experienced in the art will easily understand the operation of this device. Once the sleeve reels are attached to the hub extension on the motor wheels of a vehicle, and the cable or rope is attached to said reels in the manner explained, the motor is started in the low gear connection. The propelling shaft will turn and cause the reels at its both ends, to rotate. The rotation of the reels will cause the cable or rope to roll and haul the vehicle in the direction of the propping stakes, while the wheels are skidding.

The device according to the present invention is of so simple operation, and so cheap price, that it can be carried as a part of the equipment of any automotive vehicle, and used by any driver. For stakes, any wooden pieces can be used, but I prefer to use sharp pointed steel tubes of about one yard length. In many cases however the driver can use trunks or stumps of trees existing on the road, or any kind of wooden stakes or props which he can find or fix on the ground in the proper location, and supply a propping means. Although the wheels may skid, the rolling effort of the reels will help the displacement of the vehicle and take it out of the place where it is stuck.

I claim:

An automobile extractor for use in connection with automobiles having a rear wheel and a hub forming part thereof including a sleeve element to slidably interfit with and overlie the full length and extend beyond the hub of the rear wheel, means for securing the sleeve to the hub, the sleeve being integrally formed with spaced annular flanges to provide a cable drum, the outer flange being coincident with the extreme outer edge of the sleeve, the inner flange being coincident with that portion of the sleeve immediately overlying the extreme outer end of the hub of the wheel when the sleeve is in position on the hub, the sleeve inwardly of the inner flange being without projection, the disposition of the drum forming flanges maintaining the cable wholly beyond the end of the wheel hub to thereby avoid contact of such cable with the hub of the forward wheel of the vehicle in the operation of the extractor.

In testimony whereof I affix my signature.

SEBASTIÃO KNEIPP RAMOS.